(12) United States Patent
Ramsey, Jr. et al.

(10) Patent No.: US 6,349,478 B1
(45) Date of Patent: *Feb. 26, 2002

(54) WINDOW MEASURING DEVICE

(75) Inventors: Glen Ray Ramsey, Jr., Clarkson; James Wayne Haley, Elizabethtown, both of KY (US)

(73) Assignee: AP Technoglass Corporation, Bellefontaine, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,885

(22) Filed: Feb. 9, 1998

(51) Int. Cl.[7] .............................................. B43L 7/027
(52) U.S. Cl. ......................................... 33/474; 33/679
(58) Field of Search ............................ 33/474, 476, 482, 33/483, 494, 533, 613, 645, 526, 527, 493, 679, 562, 563, 566, 755, 759, 194, 561.3

(56) References Cited

U.S. PATENT DOCUMENTS

| | | | |
|---|---|---|---|
| 192,135 A | * 6/1877 | Somes | 33/474 |
| 194,486 A | 8/1877 | Wadsworth | |
| 310,420 A | 1/1885 | Hellings | |
| 331,047 A | 11/1885 | Fox | |
| 494,169 A | 3/1893 | Schaum | |
| 513,665 A | * 1/1894 | Barberie | 33/474 |
| 762,146 A | * 6/1904 | Cosbie | 33/511 |
| 1,002,734 A | * 9/1911 | Morse | 33/474 |
| 1,373,367 A | 3/1921 | Summers | 33/673 |
| 1,523,919 A | 1/1925 | Vitek et al. | 33/474 |
| 1,545,424 A | * 7/1925 | Heimrich | 33/574 |
| 1,579,137 A | 3/1926 | Pecker | 33/476 |
| 1,600,666 A | * 9/1926 | Dugan | 33/482 |
| 1,708,551 A | * 4/1929 | Nell | 33/476 |
| 1,742,684 A | 1/1930 | Bowman | 33/563 |
| 1,856,439 A | * 5/1932 | Sommer et al. | 33/561.3 |
| 2,101,478 A | * 12/1937 | Reich | 33/561.3 |
| 2,185,808 A | 1/1940 | Grennon | |
| 2,593,914 A | * 4/1952 | Palitto | 33/482 |
| 2,643,458 A | 6/1953 | Kellems | 33/474 |
| 2,720,706 A | * 10/1955 | Laine | 33/427 |
| 2,756,505 A | 7/1956 | Zaleski | |
| 2,795,854 A | 6/1957 | Perkal | 33/527 |
| 2,964,848 A | 12/1960 | Gonsalves | |
| 3,371,420 A | * 3/1968 | Pane, Jr. | 33/562 |
| 3,604,118 A | 9/1971 | Miller | 33/474 |
| 3,623,232 A | 11/1971 | Mahlstadt | 33/427 |
| 3,975,827 A | * 8/1976 | Roedel | 33/443 |
| 4,062,123 A | * 12/1977 | Lundquist | 409/130 |
| 4,068,383 A | * 1/1978 | Krebs | 33/767 |
| 4,268,967 A | * 5/1981 | Brana et al. | 33/1 V |
| 4,277,889 A | * 7/1981 | Oberg | 30/164.95 |
| 4,324,046 A | 4/1982 | Weinberg | 33/17 A |
| 4,461,086 A | 7/1984 | Segletes | 33/564 |
| 4,483,075 A | * 11/1984 | Kundlin | 331/21 |
| 4,585,343 A | 4/1986 | Schave et al. | |
| 4,593,476 A | * 6/1986 | Clark et al. | 33/529 |
| 4,734,993 A | * 4/1988 | Pan | 33/483 |
| 4,893,414 A | * 1/1990 | Samonek | 33/501 |
| 4,916,820 A | * 4/1990 | Kozyrski et al. | 33/42 |
| 5,028,759 A | * 7/1991 | Finley | 219/203 |
| 5,090,129 A | 2/1992 | Cunningham | |
| 5,178,659 A | 1/1993 | Watanabe et al. | |
| 5,240,816 A | 8/1993 | Noguchi et al. | |
| 5,244,484 A | 9/1993 | Chiba et al. | |
| 5,332,412 A | 7/1994 | Manabe et al. | |
| 5,349,758 A | 9/1994 | Bear | |
| 5,393,316 A | 2/1995 | Sugiyama et al. | |
| 5,440,818 A | * 8/1995 | Mailhot | 33/452 |
| 5,472,168 A | * 12/1995 | Tapp | 249/139 |
| 5,475,956 A | * 12/1995 | Agrawal et al. | 52/208 |
| 5,635,281 A | * 6/1997 | Agrawal | 428/192 |
| 5,754,272 A | * 5/1998 | Dimalanta | 351/204 |
| 5,815,939 A | * 10/1998 | Ruffer | 33/760 |

* cited by examiner

Primary Examiner—Diego Gutierrez
Assistant Examiner—R A Smith
(74) Attorney, Agent, or Firm—Harness, Dickey & Pierce, P.L.C.

(57) ABSTRACT

A window measuring device measures the distance between a target feature and a datum feature on a window. In another aspect of the present invention, a window measuring device is flexibly conformable to a curved window. Yet another aspect of the present invention provides a window measuring device having a pair of legs with incremental marking and a target feature alignment portion.

14 Claims, 2 Drawing Sheets

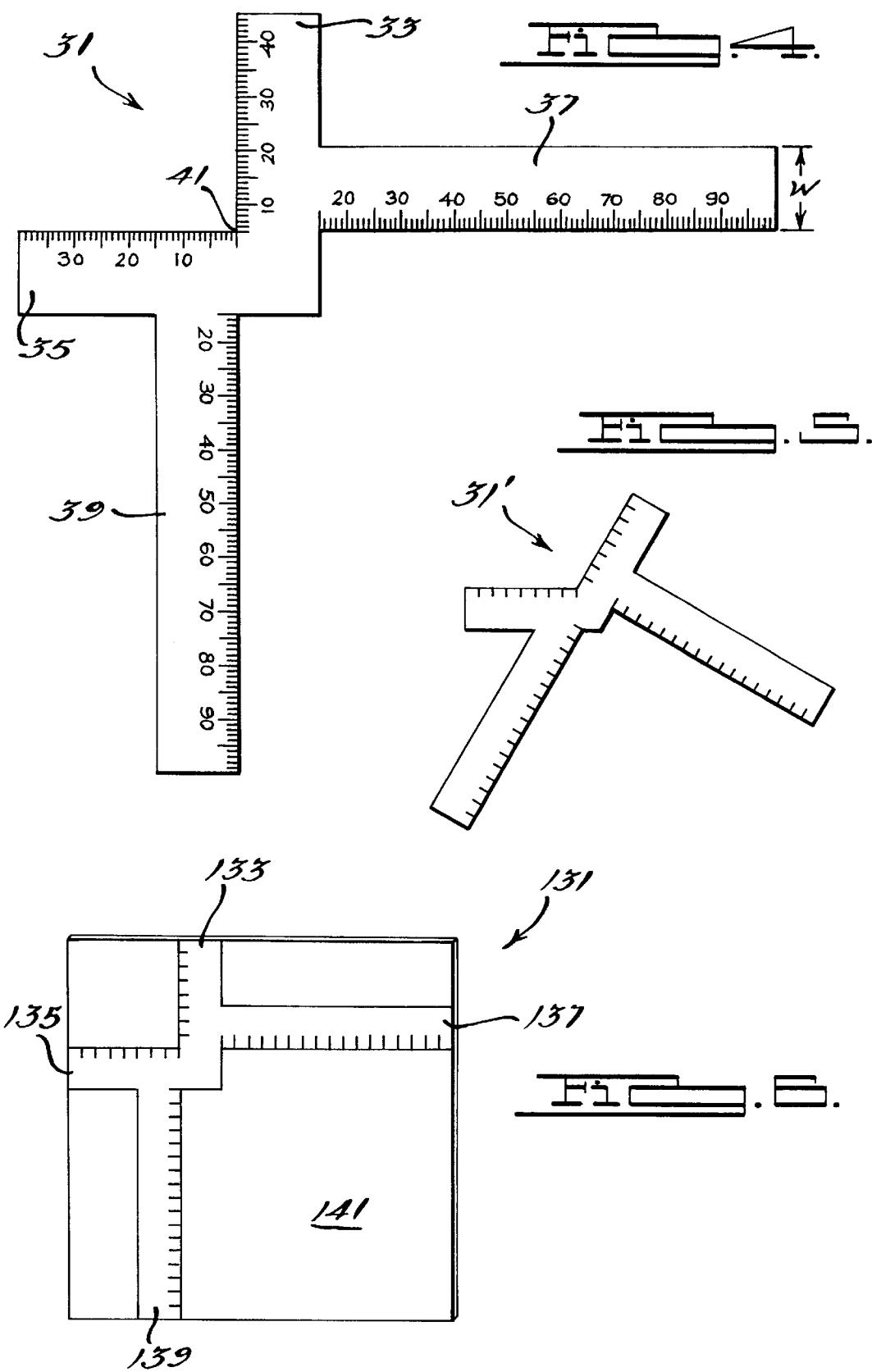

WINDOW MEASURING DEVICE

BACKGROUND OF THE INVENTION

This invention relates generally to a window measuring device and more specifically to a multi-directional measuring device for a window.

Windows for automotive vehicles usually having regions of colored or opaque ceramic frit which is silkscreened onto flat glass panels which are subsequently bent into a final curved shape. Such frit regions often include manufacturer logos, part numbers, heating grids, antennas and a blackout band adjacent to an edge of the window. It has been desirable to measure the distance of such logos and features from the edge of the window in order to check the accuracy of the silkscreening operation. Conventionally, such measuring has been conducted by use of a single or a pair of separate rulers. This has been proven to be inaccurate, unwieldy and time consuming.

Various traditional carpentry and drafting measurement tools, entirely independent from the glass industry, have also been employed for this window measuring purpose. For example, reference should be made to the following U.S. Pat. No. 5,090,129 entitled "Carpenter Square" which issued to Cunningham on Feb. 25, 1992; U.S. Pat. No. 494,169 entitled "Combination Gage" which issued to Schaum on Mar. 28, 1893; and U.S. Pat. No. 310,420 entitled "Combination Gage" which issued to Hellings on Jan. 6, 1885. Furthermore, U.S. Pat. No. 2,964,848 entitled "Portable Glass Cutting Machine" which issued to Gonsalves on Dec. 20, 1960 discloses a glass cutting machine having multiple measuring members. However, these devices, too, have been unsatisfactory for the intended purpose.

SUMMARY OF THE INVENTION

In accordance with the present invention, the preferred embodiment of a window measuring device measures the distance between a target feature and a datum feature on a window. In another aspect of the present invention, a window measuring device is flexibly conformable to a curved window. Yet another aspect of the present invention provides a window measuring device having a pair of legs with incremental markings and a target feature alignment portion. In still another aspect of the present invention, a window measuring device is employed to measure the distance between an opaque target feature and at least two edges of a window.

The window measuring device of the present invention is advantageous over prior arrangements by providing a much more accurate measurement. The integrated and one-piece multi-directional construction of the present invention further allows for measurements to be taken in two directions in a quick, generally simultaneous manner. The flexible nature of the present invention is ideally suited in measuring "frit to edge of window" distances for formed automotive glass. Furthermore, the present invention is very economical to produce, compact and is durable since it has no moving parts. Additional advantages and features of the present invention will become apparent from the following description and appended claims, taken in conjunction with the accompanying drawings.

BRIEF DESCRIPTION OF THE DRAWINGS

FIG. 4 is a true elevational view showing the preferred embodiment window measuring device;

FIG. 5 is a true elevational view showing a first alternate embodiment of the window measuring device; and FIG. 6 is a perspective view showing a second alternate embodiment of the window measuring device.

DETAILED DESCRIPTION OF THE PREFERRED EMBODIMENT

Figure 1:
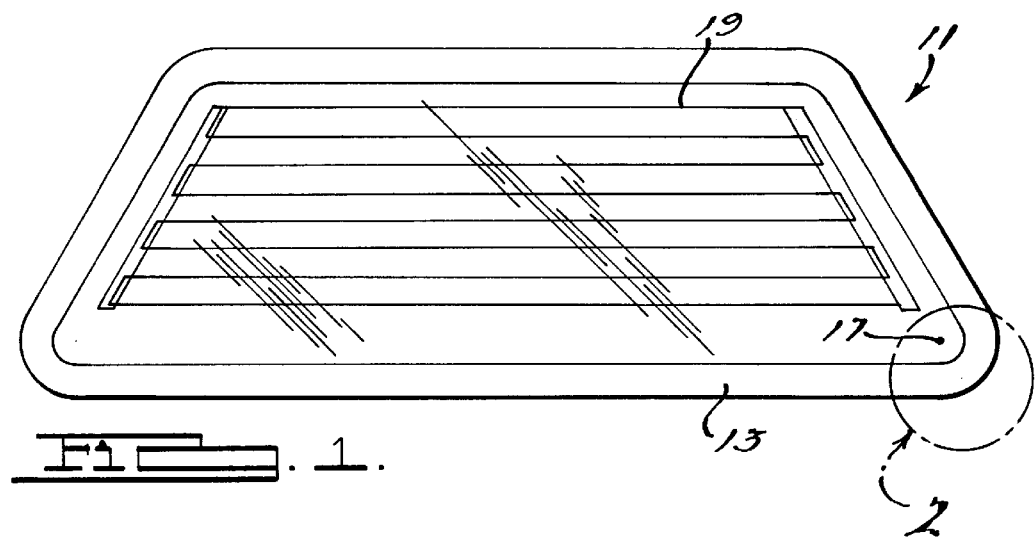
FIG. 1 is a rear elevational view showing a typical rear automotive window with which the present invention is utilized.
Figure 2:
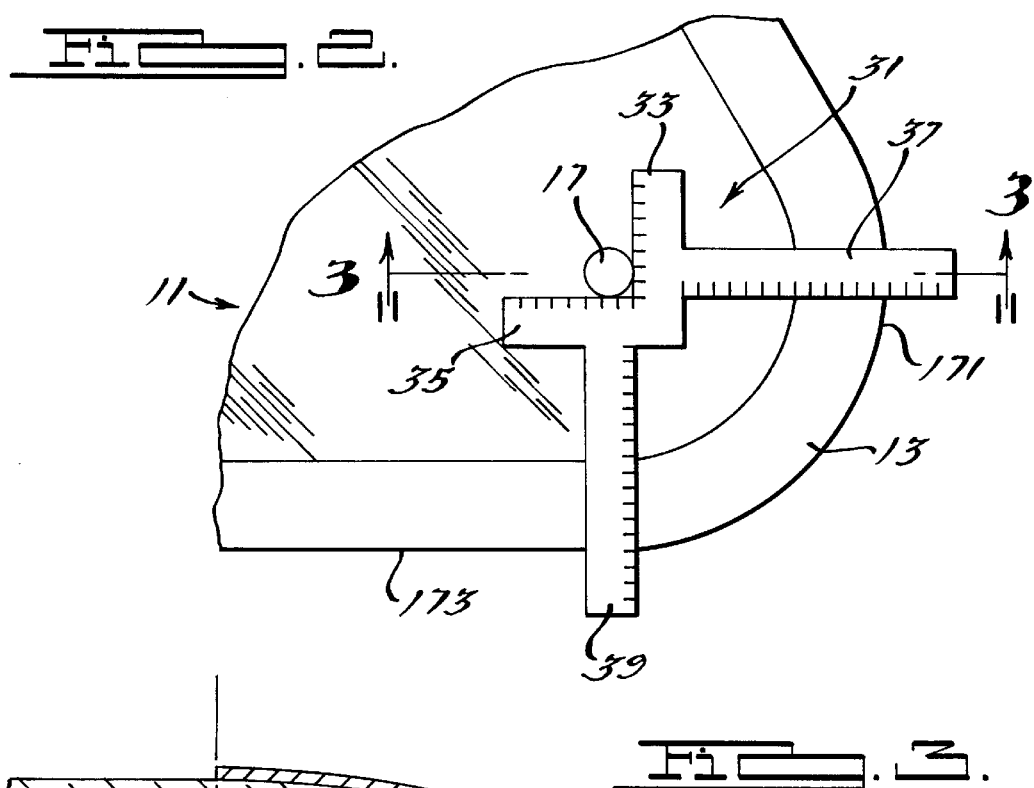
FIG. 2 is an enlarged rear elevational view, taken within circle 2 of FIG. 1, showing the preferred embodiment of the window measuring device of the present invention in use in the window of FIG. 1.
Figure 3:
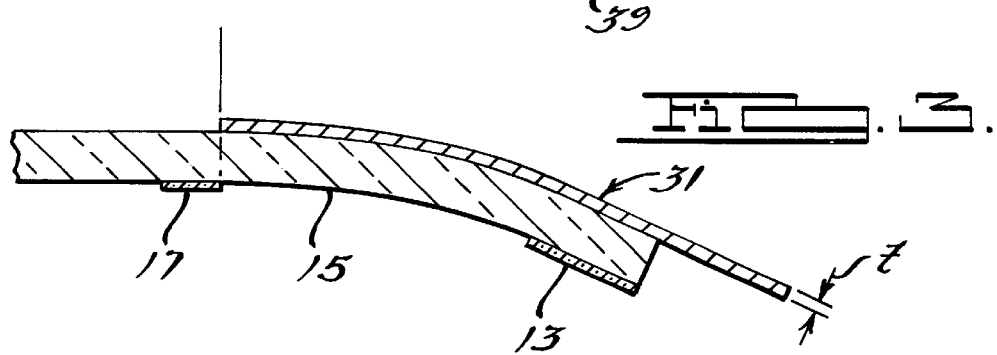
FIG. 3 is a cross sectional view, taken along line 3—3 of FIG. 2, showing the preferred embodiment of the window measuring device in use on the window of FIG. 1.

A curved rear window or backlite 11 is shown in FIGS. 1—3. Backlite 11 is formed from a sheet of glass. A ceramic frit blackout band 13 is silkscreened onto an interior surface 15 of backlite 11. A ceramic frit manufacturer's logo 17 or part number is also silkscreened onto backlite 11. Furthermore, a ceramic frit defroster grid 19 is silkscreened onto interior surface 15 of backlite 11. The ceramic frit is generally opaque and often colored black, brown or silver. The frit is denoted herein as an example of a target feature. The ceramic frit is composed of materials such as those disclosed in U.S. Pat. No. 5,244,484 entitled "Process for Producing a Curved Glass Plate Partially Coated with a Ceramic" which issued to Chiba et al. on Sep. 14, 1993 and is incorporated by reference herein.

The preferred embodiment of a window measuring device 31 includes four integrally joined and elongated legs 33, 35, 37 and 39. Referring to FIGS. 2–4, each of the legs have incremental markings adjacent to an edge. The incremental markings are illustrated herein as millimeters, but can be in any predetermined units of measurement. Leg 37 is perpendicularly joined to a middle section of relatively shorter leg 33 while leg 39 is perpendicularly joined to a middle section of relatively shorter leg 35. Legs 33 and 35 are perpendicularly joined together to define a crotch 41. The incremental markings of the legs 37 and 39 preferably include an axis that intersects the crotch 41 of the legs 33 and 35. The leg angles of a window measuring device 31' may vary as is alternately shown in FIG. 5 in order to optimally coincide to the orientation of the datum or reference points desired.

Window measuring device 31 is preferably stamped from a single piece of sheet steel but may alternately be cut from plastic which has minimal expansion properties due to heat or moisture. The thickness t of window measuring device 31 is much less than its leg width w. Thus, window measuring device 31 can flexibly conform to a highly curved window as is typical for automotive vehicles.

Another alternate embodiment of the present invention can be observed in FIG. 6. In this embodiment, a window measuring device 131 has the outlines of four legs 133, 135, 137 and 139 printed, silkscreened, etched or otherwise permanently affixed to a thin sheet of transparent plastic 141. Plastic sheet 141 can be made of flexible acrylic, mylar or the like. This advantageously protects the window from any inadvertent damage or scratching during measuring. It is also lightweight and easy to see through the legs.

The preferred embodiment window 11 and measuring device 31 are made and used together as follows. The edges of a window are cut and then ground from a large flat sheet of glass. The ceramic frit, including target features, is then silkscreened onto the window and heated to dry. Next, the window is heated in a furnace and bent to a desired curved shape. The formed window is subsequently cooled on a quench ring. Examples of such steps and machinery can be found in the following U.S. patents, which are assigned to Asahi Glass Company Ltd. and are incorporated by reference herein: U.S. Pat. No. 5,393,316 entitled "Glass Plate Bend-Shaping Apparatus and Method of Bend-Shaping a Glass Plate" which issued to Sugiyama et al. on Feb. 28, 1995; U.S. Pat. No. 5,332,412 entitled "Process for Producing a Glass Sheet with a Ceramic Color Composition and a Conductive Strip" which issued to Manabe et al. on Jul. 26, 1994; U.S. Pat. No. 5,240,816 entitled "Method of Producing a Screen for Printing a Heating Line Pattern and a Method of Forming a Heating Line Pattern on a Glass Plate" which issued to Noguchi et al. on Aug. 31, 1993; and U.S. Pat. No. 5,178,659 entitled "Method of an Apparatus for Bend-Shaping a Glass Plate and Bending Mold Used for Them" which issued to Watanabe et al. on Jan. 12, 1993.

After the previous steps, the window measuring device is employed to check the locational accuracy of the frit, including target features, to a datum or reference, such as the window's edges. More specifically, logo 17 is aligned in crotch 41 of measuring device 31 such that the inside facing edges of legs 33 and 35 contact against the outside edges of logo 17. Concurrently, legs 37 and 39 overhang edges 171 and 173 of window 11, respectively. Hence, two visually observed distance measurements can be read and compared to desired values. It should be appreciated that such a measurement can be conducted on either the inside or outside window surface. The incremental markings on measuring device 31 can also be continuous between the crotch and window edge portion of the legs.

While various embodiments of the window measuring device and window have been disclosed, it should be appreciated that other modifications may be employed without departing from the present invention. For example, the present invention measuring device can be used with windshields, automotive side windows, appliance shelves, building windows, or other formed or flat windows. Furthermore, a target feature alignment portion on the measuring device 31 can be differently configured and may even fully surround the target feature. The target feature can also constitute a formed glass shape or adhesively applied part rather than an opaque frit marking. In another construction, the device may have a "+" configuration wherein the legs 33/35 and 35/37 are aligned with each other. Various materials for constructing the measuring device 31 have been disclosed in an exemplary fashion, however, other materials may of course be employed. It is intended by the following claims to cover these and any other departures from the disclosed embodiments which fall within the true spirit of this invention.

The invention claimed is:

1. A window measuring device comprising:
   a first leg;
   a second leg joined to said first leg at an intersection, said first and second legs being angularly offset from each other;
   a third leg joined to said first leg, said third leg being approximately perpendicularly offset from said first leg, axially offset from said second leg, and extending away from said intersection, said third leg having incremental markings along a first line that extends coaxially through said intersection and along an edge of said second leg; and
   a fourth leg joined to said second leg, said fourth leg being approximately perpendicularly offset from said second leg, axially offset from said first leg, and extending away from said intersection, said fourth leg having incremental markings along a second line that extends coaxially through said intersection approximately perpendicularly to said first line and along an edge of said second leg.

2. The device of claim 1 wherein said first leg has incremental markings.

3. The device of claim 2 wherein said second leg has incremental markings.

4. The device of claim 1 wherein said first leg is substantially perpendicular to said second leg.

5. The device of claim 1 wherein all of said legs are substantially straight and elongated in a true view.

6. The device of claim 1 wherein at least two of said legs are flexible.

7. The device of claim 1 wherein said legs are made from a single piece of metal.

8. The device of claim 1 further comprising a transparent sheet and wherein said legs are located on said transparent sheet.

9. A window measuring system for a window having a target feature and a datum feature, comprising:
   a measuring device having a first pair of incrementally marked legs intersecting each other to define an intersection, said intersection of said first pair of legs aligning with the target feature;
   a second pair of incrementally marked legs angularly offset from each other and extending away from said intersection, a first leg of said second pair of legs being axially offset from one leg of said first pair of legs, a second leg of said second pair of legs being axially offset from the other leg of said first pair of legs, said incremental markings on said first leg being disposed along a first line intersecting said intersection and extending to the datum feature for providing a measurement between the target and datum features, said incremental markings on said second leg being disposed along a second line intersecting said intersection for providing a measurement between the target and datum features, said second line being further disposed approximately perpendicularly to said first line; and
   a transparent sheet wherein said first pair of legs and said second pair of legs are located on said transparent sheet.

10. The system of claim 9 wherein said first and second pairs of legs are flexible to conform to a curved portion of the window.

11. The system of claim 10 wherein said legs are made from a single piece of metal.

12. The system of claim 9 wherein the target feature is substantially opaque.

13. The system of claim 12 wherein the target feature is a ceramic frit.

14. The system of claim 9 wherein the datum feature is an edge of the window.

* * * * *